United States Patent [19]

Sugawara

[11] Patent Number: 4,833,497
[45] Date of Patent: May 23, 1989

[54] APPARATUS FOR ADJUSTING FOCUS IN THE MACRO-PHOTOGRAPHING MODE OF AN AUTOMATIC FOCUS CAMERA

[75] Inventor: Saburo Sugawara, Tokyo, Japan

[73] Assignee: Asahi Kogaku Kogyo Kabushiki Kaisha, Tokyo, Japan

[21] Appl. No.: 159,765

[22] Filed: Feb. 24, 1988

[30] Foreign Application Priority Data

Feb. 25, 1987 [JP] Japan .................. 62-42198

[51] Int. Cl.$^4$ .............................................. G03B 3/00
[52] U.S. Cl. .................................................. 354/403
[58] Field of Search ........................................ 354/403

[56] References Cited

U.S. PATENT DOCUMENTS

| | | | |
|---|---|---|---|
| 4,582,411 | 4/1986 | Ohmura et al. | 354/403 |
| 4,660,954 | 4/1987 | Fujita et al. | 354/403 |
| 4,682,886 | 7/1987 | Toyama et al. | 354/403 |

*Primary Examiner*—Russell E. Adams

*Attorney, Agent, or Firm*—Sandler & Greenblum

[57] ABSTRACT

An apparatus for adjusting the focus in the macro-photographing mode of an automatic focusing camera. The apparatus includes an object distance measuring optical system further including a light emitting lens of a measuring light reflected by an object, a zoom photographing optical system which is moved to the focal point thereof in accordance with the distance data of the light receiving lens and which is, in the macro-photographing mode, at least partially moved by a predetermined amount beyond an extreme focal length in the normal photographing mode, a mask which has an aperture having a center which is offset from the optical axis of the object distance measuring optical system and a prism for deflecting the measuring light which passes through the aperture of the mask toward the light receiver. The mask and the deflecting means are retractably located in front of the light receiver in the macro-photographing mode.

31 Claims, 6 Drawing Sheets

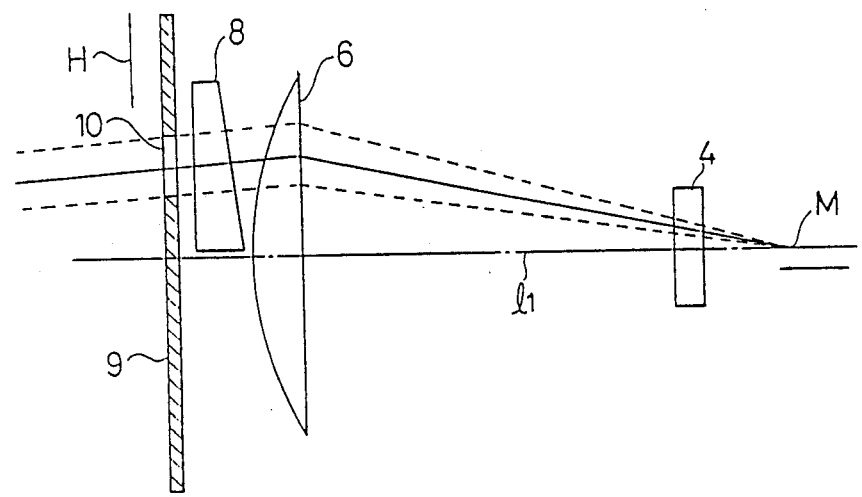
_Fig-3_
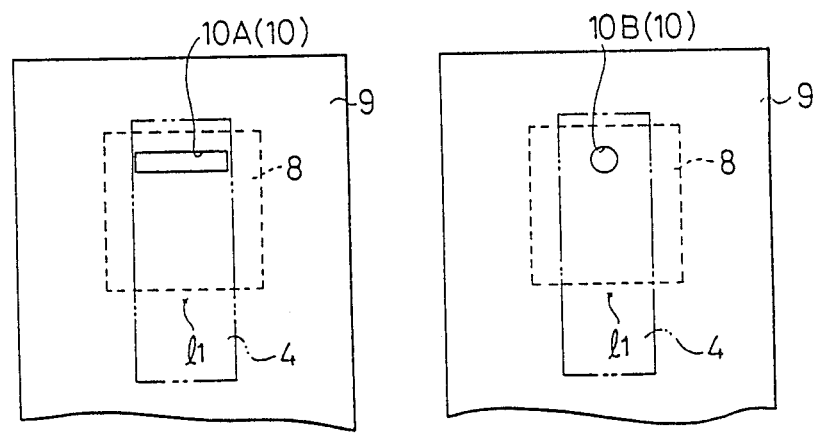
_Fig-4A_   _Fig-4B_

PRIOR ART

APPARATUS FOR ADJUSTING FOCUS IN THE MACRO-PHOTOGRAPHING MODE OF AN AUTOMATIC FOCUS CAMERA

BACKGROUND OF THE INVENTION

1. Field of the Invention

The present invention relates to an object detecting system in an automatic focusing camera having a macro-photographing function.

2. Description of Related Art

There is known an automatic focusing camera in which a zoom photographing optical system is automatically moved to a focus point in accordance with distance data which are detected by an object distance measuring device based on a triangulation measuring principle. The zoom photographing optical system is also moved, at least partially, by a predetermined amount in the macro-photographing mode (i.e., for photographing objects at a close distance).

For instance, FIG. 7 schematically shows a simple optical arrangement of a known two-group zoom lens which forms the zoom photographing optical system. In the arrangement shown in FIG. 7, the object distance U between the focal point F of the entire two-group zoom lens and an object to be photographed is given by the following equation:

$$U = f_1(2 + X/f_1 + f_1/X) + HH + \Delta \qquad (1)$$

wherein

X: feed displacement of the zoom photographing lens
$f_1$: focal length of the first lens group 1
HH: principal point distance of the first lens group 1
$\Delta$: distance between the focal point $F_1$ of the first lens group 1 and the focal point F From the equation (1), the displacement can be expressed as:

$$X = \{-2f_1 - HH - \Delta + U - \sqrt{(2f_1 + HH + -U)^2 - 4f_1^2}\}/2 \qquad (2)$$

Note that in FIG. 7, the second lens group is designated 2, and H and H' designate principal points of the first lens group 1.

FIG. 8 shows a conventional object distance measuring optical system based on the triangulation measuring principle, in which 3 designates a light source, 4 a position detecting element, such as a PSD (photo sensitive detector), 5 a light projecting lens, and 6 a light receiving lens. In this measuring optical system, the light emitted from the light source 3 is reflected by the object, so that the reflected light, which is the distance measuring light, is received by the position detecting element 4 to detect the object distance. The relationship between the distance U of the object from a film plane 7 and a deviation t of the light on the position detecting element 4 is given by the following equation:

$$t = L \cdot f/(U - f - d) \qquad (3)$$

wherein

L: base length between the light emitting lens 5 and the light receiving lens 6
f: focal length of the light receiving lens 6
d: distance between the film plane 7 and the focal plane of the light receiving lens 6

Note that a reference position in which the deviation t is zero (t=0) is a point on the position detecting element on which an image of the light source is focused at an infinite object distance ($\infty$).

The deviation t can be detected by a value of the electrical current to which the amount of light received by the position detecting element 4 is converted, as is well known. The zoom photographing optical system is moved to the focal point in accordance with the value of the electrical current, on the basis of the above-mentioned equations (2) and (3) to effect automatic focusing. A drive mechanism for such a zoom photographing optical system in an automatic focusing camera is well known.

In the automatic focusing camera, it is necessary to shift the range of measurement of the object distance toward a close object distance side to enable the macro-photographing function.

In the close photographing function, at least a part of the zoom photographing optical system is moved further toward the object from an extreme focal length in the normal photographing mode, so that the focusing operation can be effected, as is well known. In the zoom photographing optical system shown in FIG. 7, the first lens group 1 of the photographing lens system is moved by a constant displacement independently of the displacement which is caused by the automatic focusing device.

FIG. 9 shows a known optical arrangement in which the distance range which can be measured by the distance measuring device is shifted toward the close distance side. As shown in FIG. 9, a prism 8 having an apex angle of $\theta$ and a mask (not shown) are retractably located in front of the light receiving lens 6, so that the measurable distance range can be shifted toward the close distance side.

Supposing that the refractive index of the prism 8 is n, the deviation $t_1$ of the image of the light source on the position detecting element 2 in connection with the object distance $U_1$ can be obtained by the following steps.

The mask mentioned above is provided on the front face of the prism 8 and has an aperture center coaxial to the optical axis $l_1$.

First, the incident angle $\alpha$ of the light $P_1$ upon the surface $S_1$ of the prism 8 adjacent to the object is determined by the following equation:

$$\alpha = \tan^{-1}\{L/(U_1 - f - d)\} \theta \qquad (4)$$

The refraction angle $\beta$ of the light $P_1$ incident upon the prism 8 having an apex angle $\theta$ at an incident angle $\alpha$ is given by the following equation.

$$\beta = \alpha - \theta + \sin^{-1}[n \cdot \sin\{\theta - \sin^{-1}(\sin \alpha/n)\}] \qquad (5)$$

For $\gamma = \alpha - \theta - \beta$, the deviation $t_1$ on the position detecting element 4 with the apex angle $\theta$ satisfies the following equation:

$$t_1 = f \cdot \tan \gamma \qquad (6)$$

Accordingly, the deviation $t_1$ of the image of the light source on the position detecting element 4 can be obtained by the equations (5) and (6).

If the object distance at which the light meeting with the optical axis $l_1$ of the light receiving lens 6 intersects the optical axis $l_2$ of the light emitting lens 5 is $Umf_1$, and if the thickness of the prism 8 is neglected, the following equation is obtained:

$$Umf_1 = L/\tan\{\sin^{-1}(n\cdot\sin\theta) - \theta\} + f + d \quad (7)$$

For a photographing optical system composed of a two-group zoom lens, Table 1 shows the calculation results in which the focal length $f_1$ of the first lens group 1 is $f_1 = 24.68$ mm, the principal point distance $HH = 7.02$ mm, the distance $\Delta$ between the focal point $F_1$ of the first lens group and the focal point $F$ of the two-group zoom lens is $\Delta = 30.04$ mm, the distance d between the film plane 7 and the focal plane of the light receiving lens 6 is $d = 6.292$ mm, the shift displacement of the first lens group 1 at the close photographing mode is 0.5502 mm, the base length L of the distance measuring device is $L = 30$ mm, the focal length f of the light receiving lens 6 is $f = 20$ mm, the apex angle $\theta$ of the prism 8 is $\theta = 2.826°$, the refractive index n of the prism is $n = 1.483$ (wavelength = 880 nm), the measurable distance range is 0.973 m ~ ∞, the number of steps of forward feeding movement is 18 among which the range of 0.973 m ~ 6 m is divided into 17 steps. The calculation is directed to the shift of the range of 0.973 m ~ 6 m to the range of 0.580 m ~ 1.020 m.

In the table, 17–18 designates the transfer point between the 17th step and the 18th step and 0–1 a transfer point between zero and the 1st step. In Table 1, the deviation t was obtained from the equation (3) and the deviation $t_1$ was obtained from the equations (4), (5), and (6).

TABLE 1

COMPARISON OF POSITIONS OF IMAGE OF LIGHT SOURCE ON POSITION DETECTING ELEMENT AT DIFFERENT DISTANCES IN NORMAL PHOTOGRAPHING MODE AND CLOSE PHOTOGRAPHING MODE WITH PRIOR ART APPARATUS

| STEP NO. | U(m) | $U_1$(m) | t(mm) | $t_1$(mm) | $t_1$-t(mm) | DIFF. IN STEP (STEP) |
|---|---|---|---|---|---|---|
| 17–18 | 6.000 | 1.020 | 0.1004 | 0.1274 | 0.0270 | +0.818 |
| 17 | 5.154 | 0.996 | 0.1170 | 0.1423 | 0.0253 | +0.767 |
| 16 | 4.027 | 0.951 | 0.1500 | 0.1719 | 0.0219 | +0.670 |
| 15 | 3.310 | 0.911 | 0.1827 | 0.2013 | 0.0186 | +0.571 |
| 14 | 2.814 | 0.875 | 0.2153 | 0.2305 | 0.0153 | +0.474 |
| 13 | 2.450 | 0.841 | 0.2476 | 0.2595 | 0.0120 | +0.374 |
| 12 | 2.172 | 0.810 | 0.2797 | 0.2884 | 0.0087 | +0.274 |
| 11 | 1.952 | 0.782 | 0.3115 | 0.3170 | 0.0055 | +0.174 |
| 10 | 1.775 | 0.756 | 0.3432 | 0.3455 | 0.0023 | +0.073 |
| 9 | 1.628 | 0.732 | 0.3747 | 0.3738 | −0.0009 | −0.029 |
| 8 | 1.504 | 0.709 | 0.4059 | 0.4018 | −0.0041 | −0.132 |
| 7 | 1.399 | 0.688 | 0.4369 | 0.4298 | −0.0072 | −0.233 |
| 6 | 1.309 | 0.668 | 0.4678 | 0.4575 | −0.0103 | −0.337 |
| 5 | 1.230 | 0.650 | 0.4984 | 0.4850 | −0.0134 | −0.441 |
| 4 | 1.161 | 0.633 | 0.5288 | 0.5124 | −0.0165 | −0.545 |
| 3 | 1.100 | 0.616 | 0.5591 | 0.5396 | −0.0195 | −0.650 |
| 2 | 1.045 | 0.601 | 0.5891 | 0.5666 | −0.0225 | =0.755 |
| 1 | 0.996 | 0.587 | 0.6189 | 0.5934 | −0.0255 | −0.856 |
| 0–1 | 0.973 | 0.580 | 0.6338 | 0.6068 | −0.0270 | −0.906 |

$Umf_1 = 1.283$ m

From the results shown in Table 1, it can be understood that the adjustment by the prism 8 using the measuring light Which passes through the aperture of the mask coaxial to the optical axis $l_1$ causes a deviation of 0.027 mm on the position detecting element 4 at the extremities of the measurable distance range in the close photographing mode. This deviation corresponds to about 1 step in terms of the number of feeding steps of movement. Therefore, if the feeding movement of the photographing optical system is controlled directly in accordance with the output of the position detecting element 4, it is impossible to move the photographing lens to a correct focal point, resulting in it being out of focus. For example, in the macro-photographing mode at $U_1 = 0.996$ m, if the deviation $t_1$ is 0.1170 mm, the zoom photographing lens can be moved to a correct focal point. However, since the actual deviation $t_1$ is 0.1423 mm, the zoom photographing lens cannot be moved beyond the 16th step, so that the zoom photographing lens cannot be exactly focused. This is because that, in a measuring optical system using a measuring light which passes through the aperture center of the mask coaxial to the optical axis $l_1$, it is impossible to largely change the variation of the deviation $t_1$ of the image of the light source on the position detecting element 4 relative to the object distance $U_1$.

To solve the problem mentioned above, the assignee of the present application has proposed a focus adjusting device for increasing the precision of the adjustment of the focus at the macro-photographing mode, in PCT Patent Application No. PCT/JP87/00293. In this prior application, a prism which has two total reflection surfaces and a mask are provided to substantially increase the measuring base length L in order to adjust the focus, so that the difference in deviation of the image of the light source on the position detecting element 4 between the normal photographing mode and the macro-photographing mode can be limited to approximately 0.0001 mm.

In the aforementioned application, it was found that complete compensation for the difference in deviation between the normal photographing mode and the macro-photographing mode can be achieved if the rate of deviation $t_1$ is adjusted by multiplying this rate by 1.1130 (calculated by dividing 0.5334 by 0.4794), which equals the change in t from step 0–1 to step 17–18 divided by the change in $t_1$ between step 0–1 and step 17–18, since decreases in the deviations t and $t_1$ between steps 17–18 and 0–1 are 0.5334 mm and 0.4794 mm, respectively. The prism arrangement used in the application provides that compensation.

However, in the prior application, since a prism having two total reflection surfaces is used, there are drawbacks as follows.

First, a strict tolerance for the angular dimension of the prism is necessitated.

Second, in order to ensure a large quantity of light, it is necessary to use a large prism or to use a plurality of prisms, resulting in a large optical system difficult to operate.

SUMMARY OF THE INVENTION

An object of the present invention is to provide a simple apparatus for adjusting a focus in the macro-photographing mode in an automatic focusing camera which can increase the precision of the adjustment in comparison with the conventional focus adjusting apparatus in which the measuring light is coaxial with the optical axis of the light receiving lens.

According to the present invention, there is provided an apparatus for adjusting the focus in the macro-photographing mode of an automatic focusing camera having a triangulation measuring principle type of object distance measuring optical system. This system includes a light emitter which emits measuring light and a light receiver which receives the measuring light reflected by an object to be photographed to output distance data, and a zoom photographing optical system which is moved to the focal point thereof in accordance with the distance data and which is, in the macro-photographing mode, at least partially moved by a predetermined displacement beyond an extreme focal point in the normal photographing mode. The apparatus further includes a mask which has an aperture, the center of which is offset from the optical axis of the object distance measuring optical system, and a mechanism for deflecting the measuring light which passes through the aperture of the mask toward the light receiver. The mask and the deflecting mechanism are retractably located in front of the light receiver in the macro-photographing mode.

It is a further object of the present invention to provide an object distance measuring optical system positioned along an optical axis; a measuring light emitting source for directing measuring light toward an object; a device for receiving the measuring light reflected by the object; a mask adapted to be located between the object and the measuring light emitting source with an aperture located in the mask adapted to permit the measuring light to pass therethrough, with the aperture having a center which is offset from the optical axis; and a device for deflecting the measuring light which passes through the aperture. The device for receiving the measuring light includes a light receiving lens positioned along the optical axis.

In another aspect of the present invention, the measuring light receiving device further includes a light position detecting element positioned to detect light received from the light receiving lens.

In another aspect of the present invention, the measuring light receiving device further includes a prism having a single light receiving surface.

It is a further object of the present invention to provide a focus adjusting apparatus for a camera which incorporates the object distance measuring optical system mentioned above wherein the light position detecting element is adapted to generate an output signal for moving at least a portion of a photographic optical system of the camera.

In another object of the present invention, the focus adjusting apparatus is intended for a camera which further includes a zoom photographing optical system which includes at least two lens groups, wherein the output signal from the light position detecting element is adapted to move at least one of the lens groups.

In a still further object of the present invention, the focus adjusting apparatus is intended for a camera wherein the zoom photographing optical system further includes means to enable focusing in a macro-photographing mode.

In a still further object of the present invention, the mask and the measuring lighty deflecting device are retractable from a position adjacent the light receiving lens, which position they are occupy during the macro-photographing mode.

In a still further object of the present invention, the mask and the measuring light deflecting device are integral.

In a still further object of the present invention, the mask and the measuring light deflecting device are connected by an adhesive.

In a still further object of the present invention, the measuring light deflecting device is a prism having a surface through which the measuring light is received, and wherein the mask is located on the prism light receiving surface.

In a still further object of the present invention, the measuring light deflecting device is a prism having a surface through which the measuring light is emitted, and wherein the mask is located on the prism light emitting surface.

It is also an object of the present invention to provide an object distance measuring optical system which includes a measuring light emitter for emitting measuring light toward an object, the distance from which is to be measured, and a measuring light receiving lens positioned along the optical axis of the optical system, and which is adapted to receive only reflected measuring light from the object in which the reflected measuring light is not coaxial with the optical axis as the measuring light is received by the measuring light receiving lens.

It is a further object of the present invention to further provide a mask having an aperture therethrough, wherein the mask is adapted to be positioned adjacent the measuring light receiving lens so that the aperture is offset from the optical axis.

It is a further object of the present invention to further provide a measuring light deflecting device adapted to be positioned adjacent the measuring light receiving lens and the mask and between the measuring light receiving lens and the object.

It is a still further object of the invention to provide a focus adjusting apparatus for a camera, wherein the apparatus incorporates the object distance measuring optical system set forth above, wherein the mask and the measuring light deflecting device are retractable from the position adjacent the measuring light receiving lens, wherein the mask blocks measuring light from being received by the measuring light receiving lens along the optical axis, to a position wherein the mask blocks substantially no measuring light from being received by th measuring light receiving lens.

It is a still further object of the present invention to further provide at least one photographic lens for the focus adjusting apparatus, and wherein the measuring light receiving device further includes a light position detecting element which is adapted to generate a signal for moving the at least one photographic lens to thereby focus the photographing optical system.

It is a still further object of the present invention to provide an automatic focus adjusting apparatus for a camera which includes a zoom photographing optical system adapted for operation in a normal photographing mode and a close photographing mode, wherein at least a portion of the zoom photographing optical system is moved a predetermined amount for operation in the close photographing mode, wherein the apparatus includes a light source for emitting measuring light toward an object to be photographed; a measuring light receiving lens positioned along an optical axis adapted to receive measuring light reflected from the object to be photographed; a light position detection element adapted to receive measuring light from the measuring light receiving lens and to detect thereupon a deviation of the measuring light depending upon the distance between the object and a predetermined point on the camera; a mask adapted to be moved to a position adjacent the measuring light receiving lens when the camera is set for operation in the close photographing mode and adapted to be retracted from the position when the camera is set for operation in the normal photographing mode, the mask including at least one aperture offset from the optical axis; and a measuring light deflecting device adapted to be located adjacent the mask and the measuring light receiving lens; whereby the apparatus further includes a predetermined number of feed movement measurement steps for focusing the camera in both the normal photographing mode and the close photographing mode between predetermined ranges of object distances, respectively, and wherein the deviation detected by the light position detection element at each of the steps when the camera is set at the normal photographing mode is substantially the same as the deviation detected by the light position detection element at each of the steps when the camera is set at the close photographing mode.

BRIEF DESCRIPTION OF THE DRAWING

The invention will be described below with reference to the accompanying drawing, in which:

FIG. 3 is a schematic view illustrating particular details of the apparatus shown in FIG. 1;

FIGS. 4A and 4B are front elevation views of different apertures formed in the mask shown in FIG. 1;

DETAILED DESCRIPTION

Figure 5:
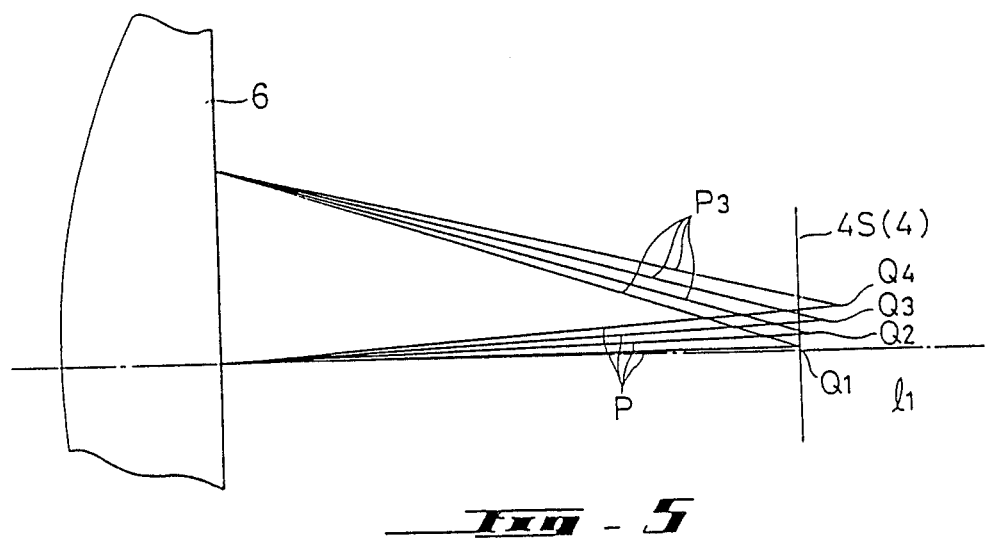
FIG. 5 is a schematic view illustrating the optical principle of the focus adjusting apparatus according to the present invention.
Figure 6:
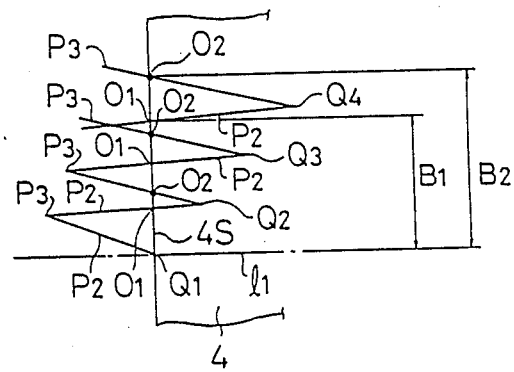
FIG. 6 is an enlarged view of FIG. 5.
Figure 7:
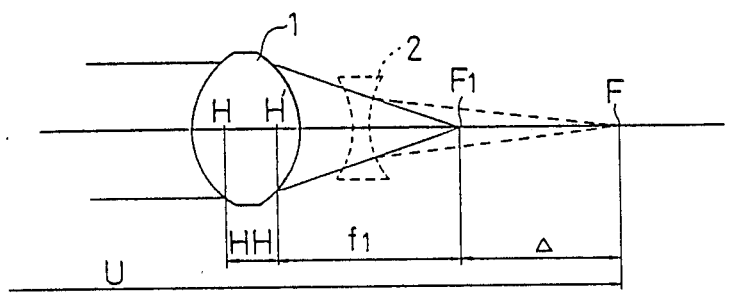
FIGS. 7, 8 and 9 are schematic views of a known focus adjusting apparatus in an automatic focusing camera illustrating different optical systems.

FIGS. 5 and 6 illustrate the principle of the present invention. With regard to the light which is transmitted through the light receiving lens 6 of the distance measuring optical system and which is incident upon the light receiving surface 4S of the position detecting element 4, when the object is located at the infinite distance, the light rays $P_2$ which are transmitted through the center of the light receiving lens 6 on the optical axis $l_1$, and which are incident upon the position detecting element 4, and the light rays $P_3$ which are transmitted through the portion of the light receiving lens 6 other than the optical axis (center point of the lens 6), and which are incident upon the position detecting element 4, are both accurately imaged on a point $Q_1$ of the light receiving surface 4S on the optical axis $l_1$. However, when the object is at a closer distance, the light rays $P_2$ passing through the center of the lens 6 (on the optical axis $l_1$) and the light rays $P_3$ off from the center of the lens 6 are imaged on different points $Q_2$, $Q_3$, and $Q_4$ which are deviated from the optical axis $l_1$ and which are not included in the light receiving surface 4S. The deviation becomes large as the object distance becomes small.

As can be seen from FIG. 6, the intersecting points $0_1$ of the light rays $P_2$ with the light receiving surface 4S are different from the intersecting points $0_2$ of the light rays $P_3$ with the light receiving surface 4S. The light rays $P_3$ are always located farther from the optical axis $l_1$ than the light rays $P_2$ which pass through the center of the lens 6. The deviation (separation) of the light from the optical axis increases as the object comes closer, as mentioned above.

The PSD which is usually used as the position detecting element 4 can detect the position, so long as the light receiving surface 4S receives a quantity of light above a predetermined lower limit. Namely, even if the light rays which are transmitted through the light receiving lens 6 are not correctly imaged on points of the light receiving surface 4S, the object distance can be detected at the incident points.

According to the present invention, the light which is transmitted through the center of the light receiving lens 6 on the optical axis $l_1$ and which is incident upon the position detecting element 4 is not used to detect the object distance, and only the light which does not pass through the center of the lens 6 is used as a measuring light to effectively utilize the position detecting element 4 so as to exactly detect the object distance. This will be explained in more detail with reference to FIG. 6.

In FIG. 6, as the object moves from the infinite object distance (the longest distance at the macro-photographing mode) to a closer distance, the points upon which the light $P_2$ and the light $P_3$ are imaged are moved from $Q_1$ to $Q_4$. If the distance is measured by using the light $P_2$, the deviation of the incident point $0_1$ of the light upon the receiving surface 4S of the position detecting element 4 is $B_1$. On the other hand, if the light $P_3$ is used to detect the object distance, the deviation of the incident point $0_2$ of the light upon the receiving surface 4S of the position detecting element 4 is $B_2$ which is clearly larger than $B_1$ ($B_2>B_1$). Namely, the variation of the light $P_3$ incident upon the position detecting element 4 with respect to the variation of the object distance is larger than that of the light $P_2$, thus resulting in an increase of the measuring efficiency and accordingly an accurate measurement. The present invention is based on the aforementioned optical principle.

Figure 8:
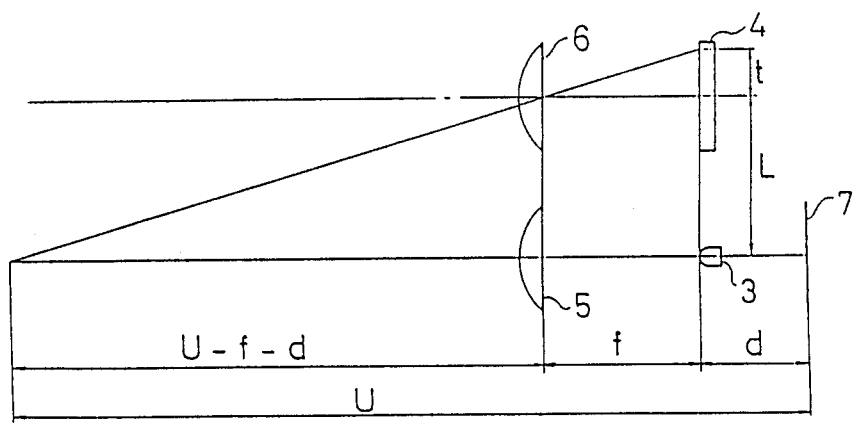
Figure 9:
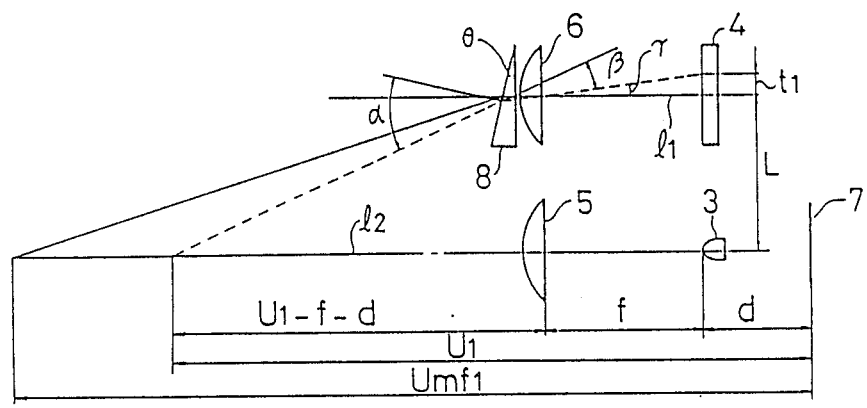

In FIGS. 1 to 4 which show an embodiment of the present invention, the elements corresponding to those in FIGS. 8 and 9 are designated with the same reference numerals.

One of the significant features of the present invention resides in the provision of the prism 8 and the mask 9 which are brought in front of the light receiving lens 6 of the distance measuring optical system in the macro-photographing mode. The mask 9 has an aperture (opening) 10 which has a center axis $0_3$ which is offset from the optical axis of the light receiving lens 6 in the macro-photographing mode.

The distance $d_{ec}$ between the center axis $0_3$ of the aperture 10 and the optical axis $l_1$ of the light receiving lens 6 is preferably as large as possible, as mentioned above. However, in practice, the distance $d_{ec}$ is properly determined, taking the size and the optical efficiency of the prism 8 into consideration. The aperture 10 can be a slit 10A (FIG. 4A) or a pin-hole 10B (FIG. 4B). The slit 10A extends in a direction perpendicular to the base length of the position detecting element 4. The size of the slit 10A or pin-hole 10B is such that the quantity of light which passes therethrough to be incident upon the position detecting element 4 is large enough to output the distance signal.

Preferably, the prism 8 and the mask 9 are located on the opposite side of the optical axis $l_1$ to the light emitting lens 5 so as to effectively utilize the length (especially, the upper half) of the position detecting element 4, when the prism and the mask are inserted in front of the light receiving lens 6 at the macro-photographing mode.

Preferably, the mask 9 and the prism 8 are integrally interconnected by means of, for example, an adhesive 40 (FIG. 2) therebetween. No adhesive 40 is located at a portion corresponding to the aperture 10 of the mask 9.

It is also possible to hold the mask and the prism together by means of a holding tool or any other equivalent means (not shown).

The mask 9 is located on the side of the prism that is located far from the light receiving lens 6. Alternatively, it is also possible to put the mask 9 on the side of the prism 8 that is located close to the light receiving lens 6, as shown by an imaginary line 9' in FIG. 2.

Figure 1:
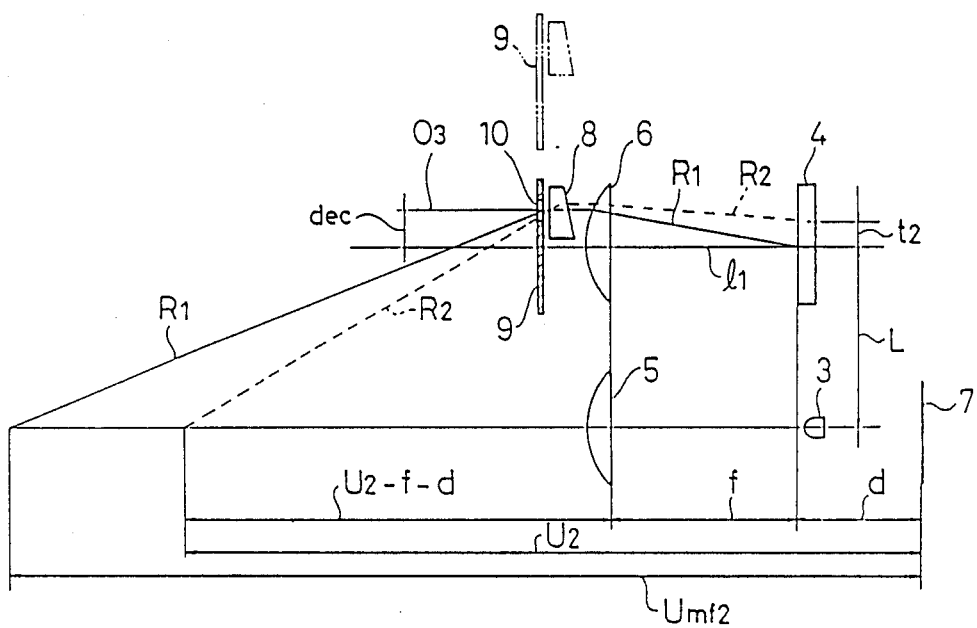
FIG. 1 is a schematic view illustrating the optical path of an apparatus for adjusting the focus in the macro-photographing mode of an automatic focusing camera according to the present invention.

Preferably, the mask 9 and the prism 8 can move between a retracted position as shown in phantom lines in FIG. 1, in which they are not in use, and an inserted position in which the center axis $O_3$ of the aperture 10 is located at a distance $d_{ec}$ from the optical axis $l_1$ of the light receiving lens 6.

Figure 2:
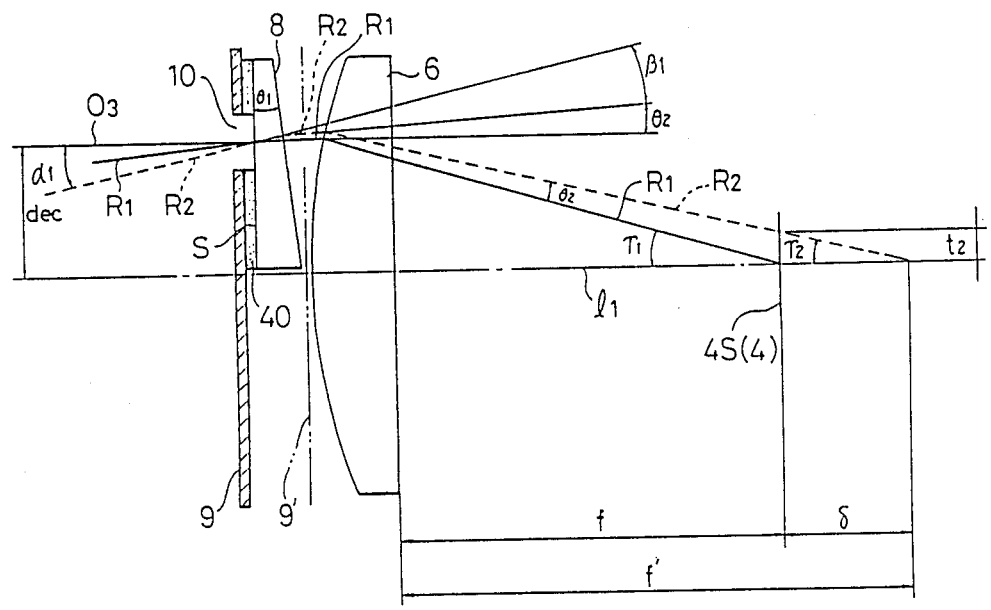
FIG. 2 is an enlarged schematic view of a mask and a prism shown in FIG. 1.

Supposing that the apex angle of the prism 8 is $\theta_1$, the refractive index is n, the deviation (distance) between the center axis $O_3$ of the aperture 10 of the mask 9 and the optical axis $l_1$ of the light receiving lens 6 is $d_{ec}$, the deviation $t_2$ of the image of the light on the position detecting element 4 with respect to the object distance $U_2$ can be determined by the following steps, with reference to FIGS. 1 and 2.

In FIGS. 1 and 2, the optical path $R_1$ shown by a solid line designates the measuring light which is reflected by a furthest object (light source image). The path $R_1$ reaches the position detecting element 4 at a point on the optical axis $l_1$ of the light receiving lens 6. The path $R_1$ is parallel with the optical axis $l_1$ between the prism 8 and the light receiving lens 6. The optical path $R_2$ shown in phantom lines designates the light which is reflected by a closer object. The thinner solid lines in FIG. 2 show extensions of the optical paths $R_1$ and $R_2$.

The incident angle $l_1$ of the light $R_2$ upon the surface S of the prism 8 adjacent to the object side is obtained by the following equation.

$$\alpha = \tan^{-1}\{(L+d_{ec})/(U_2-f-d)\} \quad (8)$$

This equation indicates that the base length of the triangulation distance increasing device is extended from L to $L+d_{ec}$.

The refraction angle $\beta_1$ of the light which is incident upon the prism 8 having an apex angle $\theta_1$ at an incident angle $\alpha_1$ is given by the following equation.

$$\beta_1 = \alpha_1 - \theta_1 + \sin_{-1}[n\cdot\sin\{\theta_1 - \sin^{-1}(\sin\alpha_1/n)\}]$$

Accordingly, an angle $\theta_2$ ($\theta_2 = \alpha_1 - \beta_1$) between the light $R_2$ emitted from the prism 8 and the center axis $l_1$ of the light receiving lens 6 is given by the following equation.

$$\theta_2 = \theta_1 - \sin^{-1}[n\cdot\sin\{\theta_1 - \sin^{-1}(\sin\alpha_1/n)\}]$$

On the other hand, $\gamma_1 = \tan^{-1}(d_{ec}/f)$, $\gamma_2 = \gamma_1 - \theta_2 f' = d_{ec}/\tan\gamma_2$, $\delta = f' - f$.

Accordingly, the deviation $t_2(=\delta \times \tan\gamma_2)$ of the image of the light source on the position detecting element 4 can be obtained by the aforementioned equations.

$Umf_2$ is an object distance at which the light $R_1$ emitted from the prism 8 is parallel with the optical axis $l_1$ of the light emitting lens 6, namely, when the image of the light source on the position detecting element 4 is located at the center of the light receiving lens 6, and is given by the following equation, when the thickness of the prism 8 and the distance between the prism 8 and the light receiving lens 6 are neglected:

$$Umf_2 = [(L+d_{ec})/\tan[\sin^{-1}\{n\cdot\sin(\theta_1 - \sin^{-1}(\sin\theta_1/n))\}]] + f + d$$

Table 2 shows, by way of an example, the calculation results in which the focal length $f_1$ of the first lens group is $f_1 = 24.68$ mm, the principal point distance $HH = 7.02$ mm, the distance $\Delta$ between the focal point $F_1$ of the first lens group and the focal point F of the entire two-group zoom lens is $\Delta = 30.04$ mm, the distance d between the film plane 7 and the focal plane of the light receiving lens is $d = 6.292$ mm, the shift displacement of the first lens group at the close photographing mode is 0.5502 mm, the base length L of the distance measuring device is $L = 30$ mm, the focal length f of the light receiving lens is $f = 20$ mm, the apex angle of the prism 8 is $\theta_1 = 3.361°$, the refractive index n of the prism 8 is $n = 1.483$, the deviation dec of the aperture center of the mask 9 from the optical axis $l_1$ of the light receiving lens 6 is $d_{ec} = 3$ mm, the measurable distance range is 0.973 m $\sim \infty$, the number of steps of movement is 18 among which the range of 0.973 m $\sim$ 6 m is divided into 17 steps. The calculation is directed to the shift of the range of 0.973 m $\sim$ 6 m to the range of 0.580 m $\sim$ 1.020 m. The numerical conditions are same as those of Table 1 mentioned above.

TABLE 2

COMPARISON OF POSITIONS OF IMAGE OF LIGHT SOURCE ON POSITION DETECTING ELEMENT AT DIFFERENT DISTANCES IN NORMAL PHOTOGRAPHING MODE AND CLOSE PHOTOGRAPHING MODE WITH PRESENT INVENTION

| STEP NO. | U(m) | $U_2$(m) | t(mm) | $t_2$(mm) | $t_2$-t(mm) | DIFF. IN STEP (STEP) |
|---|---|---|---|---|---|---|
| 17-18 | 6.000 | 1.020 | 0.1004 | 0.1005 | 0.0001 | −0.045 |
| 17 | 5.154 | 0.996 | 0.1170 | 0.1171 | 0.0001 | −0.042 |
| 16 | 4.027 | 0.951 | 0.1500 | 0.1500 | 0 | −0.018 |
| 15 | 3.310 | 0.911 | 0.1827 | 0.1827 | 0 | −0.012 |
| 14 | 2.814 | 0.875 | 0.2153 | 0.2152 | −0.0001 | −0.025 |
| 13 | 2.450 | 0.841 | 0.2476 | 0.2475 | −0.0001 | 0 |
| 12 | 2.172 | 0.810 | 0.2797 | 0.2796 | −0.0001 | +0.016 |
| 11 | 1.952 | 0.782 | 0.3115 | 0.3115 | 0 | +0.013 |
| 10 | 1.775 | 0.756 | 0.3432 | 0.3432 | 0 | +0.010 |
| 9 | 1.628 | 0.732 | 0.3747 | 0.3746 | −0.0001 | +0 |
| 8 | 1.504 | 0.709 | 0.4059 | 0.4059 | 0 | +0.026 |
| 7 | 1.399 | 0.688 | 0.4369 | 0.4369 | 0 | +0.030 |
| 6 | 1.309 | 0.668 | 0.4678 | 0.4677 | −0.0001 | +0.049 |
| 5 | 1.230 | 0.650 | 0.4984 | 0.4984 | 0 | +0.030 |
| 4 | 1.161 | 0.633 | 0.5288 | 0.5288 | 0 | +0.017 |
| 3 | 1.100 | 0.616 | 0.5591 | 0.5591 | 0 | +0.067 |
| 2 | 1.045 | 0.601 | 0.5891 | 0.5891 | 0 | +0.050 |
| 1 | 0.996 | 0.587 | 0.6189 | 0.6190 | 0.0001 | +0.023 |
| 0-1 | 0.973 | 0.580 | 0.6338 | 0.6338 | 0 | +0.027 |

$Umf_2 = 1.190$ m

It can be seen from Table 2 that according to the resent invention the measurement difference between the normal photographing mode and the close photographing mode is restricted to less than ±0.1 step, and that the deviation of the images on the position detecting element at different steps between the normal photographing mode and the macro-photographing mode will be within ±0.0001 mm. Thus, in the present invention, the accuracy of measurement at the macro-photographing mode can be increased in comparison with the prior art in which the aperture center $O_3$ meets with the optical axis $l_1$ of the light receiving lens 6, so that the light passing through the aperture 10 of the mask 9 is used to detect the object distance. Furthermore, according to the present invention, since only the mask 9 (together with the prism 8, if integral therewith) is moved so that the aperture center $0_3$ thereof is deviated from the optical axis $l_1$, the apparatus of the present invention can be easily manufactured and operated. As can be seen from FIG. 3, upon assembling and adjusting the apparatus of the invention, when at least one of the prism 8 and the mask 9 is moved toward the base length (in the direction shown by an arrow H), the focus point M is displaced in the optical axis direction, so that the image of the light source on the position detecting element 4 is displaced accordingly so as to easily adjust the focus.

Also, according to the present invention, since the prism 8 does not have two total reflection surfaces, unlike the prior art, no strict angular tolerance of the prism is necessitated, resulting in an easy adjustment thereof. Preferably, the prism 8 and the mask 9 are integral with each other after they are adjusted in position.

As can be understood from the above discussion, according to the focus adjusting apparatus of the present invention, since the light which is incident upon a portion of the light receiving lens different from the optical axis thereof and which is emitted from a portion of the light receiving lens different from the optical axis thereof is used as the measuring light so as to adjust the focus at the macro-photographing mode, the object distance can be easily and accurately measured by the focus adjusting apparatus of the present invention with a small and simple prism.

Although the invention has been described with reference to particular means and embodiments, it is to be understood the invention is not limited to the particulars disclosed and extends to all equivalents within the scope of the claims.

I claim:

1. In an apparatus for adjusting the focus in a macro-photographing mode in an automatic focusing camera having a triangulation measuring principle type of object distance measuring optical system having an optical axis, including a light emitter which emits a measuring light and a light receiver which receives the measuring light reflected by an object to be photographed to output distance data, and a zoom photographing optical system which is moved to the focal point thereof in accordance with the distance data and which is, in the macro-photographing mode, at least partially moved by a predetermined displacement beyond an extreme focal point in a normal photographing mode, the improvement comprising: a mask which has an aperture having a center which is offset from said optical axis of said object distance measuring optical system, and means for deflecting measuring light which passes through said aperture of the mask toward said light receiver, said mask and said means for deflecting being retractably located in front of said light receiver in said macro-photographing mode.

2. An apparatus according to claim 1, wherein said light receiver comprises a light receiving lens.

3. An apparatus according to claim 2, wherein said light emitter comprises a light projecting lens.

4. An apparatus according to claim 3, wherein said means for deflecting comprises a deflecting prism.

5. An apparatus according to claim 4, wherein said mask and said prism are retracted on the opposite side of said optical axis of said light receiving lens with respect to said light emitting lens.

6. An apparatus according to claim 5, wherein said aperture of said mask is in the form of a slit which extends in a direction perpendicular to the base length between said light emitting lens and said light receiving lens.

7. An apparatus according to claim 6, wherein said aperture of said mask is in the form of a pin-hole.

8. An apparatus according to claim 7, wherein said prism and said mask are integral with each other.

9. An apparatus according to claim 7, wherein said prism and said mask are interconnected by means of an adhesive applied therebetween.

10. An apparatus according to claim 8, wherein said mask is located on the side of the prism far from said light receiving lens.

11. An apparatus according to claim 8, wherein said mask is located on the side of the prism adjacent to said light receiving lens.

12. An object distance measuring optical system comprising:
    (a) an optical axis;
    (b) means for emitting measuring light;
    (c) means for receiving said measuring light reflected by an object;
    (d) a mask adapted to be located between said object and said means for receiving said measuring light;
    (e) an aperture located in said mask adapted to permit said measuring light to pass therethrough, said aperture having a center which is offset from said optical axis; and
    (f) means for deflecting said measuring light which passes through said aperture.

13. An object distance measuring optical system according to claim 12, wherein said means for receiving said measuring light comprises a measuring light receiving lens positioned along said optical axis.

14. An object distance measuring optical system according to claim 13, wherein said means for receiving said measuring light further comprises a light position detecting element for receiving said measuring light from said measuring light receiving lens.

15. An object distance measuring optical system according to claim 12, wherein said means for deflecting said measuring light comprises a prism having a single light reflecting surface.

16. A focus adjusting apparatus for a camera, said apparatus incorporating the object distance measuring optical system of claim 14, wherein said light position detecting element is adapted to generate an output signal for moving at least a portion of a photographic optical system of said camera.

17. A focus adjusting apparatus for a camera according to claim 16, further comprising a zoom photographing optical system comprising at least two lens groups, wherein said output signal is adapted to move at least one of said at least two lens groups.

18. A focus adjusting apparatus for a camera according to claim 17, wherein said zoom photographing optical system further comprises means to enable focusing in a macro-photographing mode.

19. A focus adjusting apparatus for a camera according to claim 18, wherein said mask and said means for deflecting said measuring light are retractable from a position adjacent said light receiving lens, which position they are in during said macro-photographing mode.

20. A focus adjusting apparatus for a camera according to claim 19, wherein said mask and said means for deflecting said measuring light are integral.

21. A focus adjusting apparatus for a camera according to claim 19, wherein said mask and said means for deflecting said measuring light are connected by an adhesive.

22. A focus adjusting apparatus for a camera according to claim 20, wherein said means for deflecting said measuring light comprises a prism having a surface through which said measuring light is received, and wherein said mask is located on said surface.

23. A focus adjusting apparatus for a camera according to claim 20, wherein said means for deflecting said measuring light comprises a prism having a surface through which said measuring light is emitted, and wherein said mask is located on said surface.

24. An object distance measuring optical system having an optical axis, said object distance measuring optical system comprising:
   a measuring light emitting means for emitting measuring light toward an object, the distance from which is to be measured; and
   a measuring light receiving lens positioned along said optical axis and which is adapted to receive only reflected measuring light from said object in which said reflected measuring light is not coaxial with said optical axis as said measuring light is received by said measuring light receiving lens.

25. An object distance measuring optical system according to claim 24, further comprising a mask having an aperture therethrough, wherein said mask is adapted to be positioned adjacent said measuring light receiving lens so that said aperture is offset from said optical axis.

26. An object distance measuring optical system according to claim 25, further comprising measuring light deflecting means adapted to be positioned adjacent said measuring light receiving lens and said mask and between said measuring light receiving lens and said object.

27. A focus adjusting apparatus for a camera, said apparatus incorporating said object distance measuring optical system of claim 26, wherein said mask and said measuring light deflecting means are retractable from said position adjacent said measuring light receiving lens wherein said mask blocks measuring light from being received by said measuring light receiving lens along said optical axis, to a position wherein said mask blocks substantially no measuring light from being received by said measuring light receiving lens.

28. A focus adjusting apparatus for a camera according to claim 27, further comprising a photographing optical system which comprises at least one photographic lens, and wherein said measuring light receiving means further comprises a light position detecting element which is adapted to generate a signal for moving said at least one photographic lens to thereby focus said photographing optical system.

29. An automatic focus adjusting apparatus for a camera which comprises a zoom photographing optical system adapted for operation in a normal photographing mode and a close photographing mode, wherein at least a portion of said zoom photographing optical system is moved a predetermined amount for operation in said close photographing mode, said apparatus comprising:
   (a) a light source for emitting measuring light toward an object to be photographed;
   (b) a measuring light receiving lens positioned along an optical axis adapted to receive measuring light reflected from said object to be photographed;
   (c) a light position detection element adapted to receive measuring light from said measuring light receiving lens and to detect thereupon a deviation of said measuring light depending upon the distance between said object and a predetermined point on said camera;
   (d) a mask adapted to be moved to a position adjacent said measuring light receiving lens when said camera is set for operation in said close photographing mode and adapted to be retracted from said position when said camera is set for operation in said normal photographing mode, said mask comprising at least one aperture offset from said optical axis; and
   (e) a measuring light deflecting means adapted to be located adjacent said mask and said measuring light receiving lens;
whereby said apparatus further comprises a predetermined number of feed movement measurement steps for focusing said camera in both said normal photographing mode and said close photographing mode between predetermined ranges of object distances, respectively, and wherein the deviation detected by said light position detection element at each of said steps when said camera is set at said normal photographing mode is substantially the same as the deviation detected by said light position detection element at each of said steps when said camera is set at said close photographing mode.

30. An object distance measuring optical system having an optical axis, said object distance measuring optical system comprising:
   a measuring light emitting means for emitting measuring light toward an object, the distance from which is to be measured;
   a measuring light receiving lens positioned along said optical axis at its center; and
   means for enabling said measuring light receiving lens to receive only reflected measuring light from said object in which said reflected measuring light does not pass through said center or said measuring light receiving lens.

31. An object distance measuring optical system according to claim 30, wherein said means for enabling comprises a mask having an aperture therethrough, wherein said mask is positioned for movement to and from a position adjacent said measuring light receiving lens such that said aperture has a center which is offset from said optical axis.

* * * * *

UNITED STATES PATENT AND TRADEMARK OFFICE
CERTIFICATE OF CORRECTION

PATENT NO. : 4,833,497

DATED : May 23, 1989

INVENTOR(S) : S. SUGAWARA

It is certified that error appears in the above-identified patent and that said Letters Patent is hereby corrected as shown below:

Column 2, line 51, change "$\alpha = \tan^{-1}\{L/(U_1-f-d)\}\theta$" to --- $\alpha = \tan^{-1}\{L/(U_1-f-d)\} + \theta$ ---.

Column 2, line 54, change "$\alpha$is" to --- $\alpha$ is ---.

Column 3, line 61, change "Which" to ---which---.

Column 7, line 30, delete the comma after "an".

Column 9, line 37, change "$1_1$" to ---$\alpha_1$---.

Column 9, line 41, change "$\alpha = \tan^{-1}\{(L+d_{ec})/(U_2-f-d)\}$" to ---$\alpha_1 = \tan^{-1}\{(L+d_{ec})/(U_2-f-d)\}$---.

Column 9, line 50, change "$\beta_1 = \alpha_1 - o_1 + \sin_{-1}[n \cdot \sin\{o_1 - \sin^{-1}(\sin\alpha_1/n)\}]$" to ---$\beta_1 = \alpha_1 - o_1 + \sin^{-1}[n \cdot \sin\{o_1 - \sin^{-1}(\sin\alpha_1/n)\}]$---.

Column 9, lines 58 and 59, change "On the other hand, $\gamma_1 = \tan^{-1}(d_{ec}/f)$, $\gamma_2 = \gamma_1 - o_2 f' = d_{ec}/\tan\gamma_2, \delta = f' - f$." to ---On the other hand, $\gamma_1 = \tan^{-1}(d_{ec}/f)$, $\gamma_2 = \gamma_1 - o_2$ $f' = d_{ec}/\tan\gamma_2, \delta = f' - f$ ---

Column 10, line 58, change "resent" to ---present---.

Column 14, line 51, change "or" to ---of---.

Signed and Sealed this

Twenty-fifth Day of August, 1992

*Attest:*

DOUGLAS B. COMER

*Attesting Officer*  *Acting Commissioner of Patents and Trademarks*